(12) United States Patent
Ishibashi

(10) Patent No.: US 6,226,329 B1
(45) Date of Patent: May 1, 2001

(54) IMAGE STORING AND PROCESSING DEVICE

(75) Inventor: Masamichi Ishibashi, Tokyo (JP)

(73) Assignee: Niles Parts Co., Ltd, Tokyo (JP)

( * ) Notice: Subject to any disclaimer, the term of this patent is extended or adjusted under 35 U.S.C. 154(b) by 0 days.

(21) Appl. No.: 09/187,223

(22) Filed: Nov. 6, 1998

(30) Foreign Application Priority Data

May 25, 1998 (JP) .................................................. 10-158657

(51) Int. Cl.[7] .............................. H04N 7/12; H04N 7/18
(52) U.S. Cl. ................... 375/240.26; 348/143; 348/148; 348/149; 386/109
(58) Field of Search .................. 375/240.26; 348/143, 348/148–149, 153–155, 159, 403.1, 425.1; 386/27, 33, 109

(56) References Cited

U.S. PATENT DOCUMENTS

| | | | |
|---|---|---|---|
| 4,511,886 | * | 4/1985 | Rodriguez .............................. 348/143 |
| 4,963,995 | * | 10/1990 | Lang ................................. 375/240.01 |
| 4,977,451 | * | 12/1990 | Besnard ................................ 348/143 |
| 5,497,419 | * | 3/1996 | Hill ........................................... 380/9 |
| 5,689,442 | * | 11/1997 | Swanson et al. ..................... 348/143 |
| 5,724,475 | * | 3/1998 | Kirsten .................................. 386/109 |
| 5,896,167 | * | 4/1999 | Omae et al. .......................... 348/149 |
| 5,915,069 | * | 6/1999 | Nishijima ............................. 348/143 |

FOREIGN PATENT DOCUMENTS

| | | | |
|---|---|---|---|
| 2749427 | * | 12/1997 | (FR) .............................. G08B/29/00 |
| 5-308638 | | 11/1993 | (JP) ................................. H04N/7/18 |

* cited by examiner

*Primary Examiner*—Vu Le
(74) *Attorney, Agent, or Firm*—Ronald P. Kananen; Rader, Fishman & Grauer

(57) ABSTRACT

An image storing and processing device is provided in which image information is efficiently stored of an event that may unpredictably happen at any time, and in which retrieval thereof is facilitated and further storage capacity is sharply improved. An analog video signal inputted from an external pick-up device 6 is converted to a digital video signal with an A/D conversion part 1, which digital video signal is then compressed in an image data compression part 2, and the resulting compression data is stored in a memory part 3. The stored image compression data is transferred to an image data expansion part 4 and is selected and expanded, and resulting image expansion data is converted to an analog signal in a D/A conversion part 5 and is then sent to a television monitor 9 for display thereof. A trigger signal input part 8 receives a trigger signal generated in response to the foregoing event happening, and a control part 7 controls the operation to compress and store only a necessary image, whereby the necessary image is selected and displayed on a television monitor 9. Only the necessary image is stored and is converted to compressed data in such a manner to improve storage efficiency.

7 Claims, 4 Drawing Sheets

025# IMAGE STORING AND PROCESSING DEVICE

BACKGROUND OF THE INVENTION

1. Field of the Invention

The present invention relates to an image storing and processing device that can be used as a skip-back camera, a railroad crossing monitor, and the like.

2. Description of the Related Art

As means for obtaining image information of events that may happen at any time or image information before such events happen, there is known conventionally a method of using a video tape recorder. For example, a conventional railroad crossing monitor for monitoring an illegal inrush of vehicles into a railroad crossing uses a continuous recording system with a video tape recorder.

The aforementioned conventional method however suffers from such problems as: (a) an image in which the event is reflected must be retrieved from a tape which results in wasteful time and labor; (b) when the tape comes to an end, it is necessary to replace the tape, and if a user does not take care of it, then necessary image information might be frequently lost; and (c) a rate of the amount of necessary data to a data amount of an entire tape used is low which results in poor efficiency. Particularly, the aforementioned conventional railroad crossing monitor has the following problems: (i) it takes time and labor to retrieve an image from a tape upon an illegal inrush of vehicles; (ii) it is necessary to replace the tape routinely upon completion of recording; and (iii) a rate of effective data to the entire data is low because of continuous recording.

SUMMARY OF THE INVENTION

An object of the present invention is to provide an image storing and processing device in which retrieval of stored image information is achieved easily in a short time.

Another object of the present invention is to provide an image storing and processing device in which there can be efficiently stored image information of an event, such as an illegal inrush of a vehicle into a railroad crossing which may happen at any time, and in which there is sharply improved a storage capacity thereof.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth herein, an image storing and processing device is provided comprising: A/D conversion means for converting a video signal from a pick-up device to a digital video signal, image compression means for compressing the digital video signal and outputting image compression data, memory means for storing the image compression data, image expansion means for selecting and expanding the image compression data stored in the memory means and outputting image expansion data, and D/A conversion means for converting the image expansion data to an analog video signal. The device is characterized in that the memory means has a plurality of groups of memory areas composed of memory areas divided in response to the previously set number of pages of memorizable images, and in that there is provided control means that forces the memory means to store compressed image data while updating each of the memory areas of the same group at a predetermined time interval when no trigger signal is inputted, and controls the operation such that storage location is altered to the memory area of another group in response to an input of the trigger signal.

In the above device of the present invention, the control means may monitor the amount of data of image compression by the image compression means and increase the compression rate when the above amount of data exceeds the memory capacity corresponding to one page of a picture image.

The pick-up device may include changeover means in which two sensors are installed where they can photograph a vehicle in a railroad crossing for detecting inrush of a vehicle into the railroad crossing and which generates the trigger signal with an opening/closing control signal of the crossing gate provided in the railroad crossing and the detection signals of the sensors and changing over the pick-up device with the detection signals of the sensors.

According to a further aspect of the present invention, a railroad crossing monitor is provided comprising: two pick-up devices installed where they can photograph vehicles in a railroad crossing, a sensor for detecting inrush of a vehicle into the railroad crossing, changeover means for changing over the pick-up devices with detection signals of the sensors, A/D conversion means for converting a video signal from the pick-up device changed over by the changeover means to a digital video signal, image compression means for compressing the digital video signal and outputting image compression data, memory means for storing the image compression data, image expansion means for expanding the image compression data stored in the memory means and outputting image expansion data, D/A conversion means for converting the image expansion data to an analog video signal, and control means for generating a trigger signal with the aid of an opening/closing control signal of a crossing gate provided at the railroad crossing and the detection signals of the sensors and forcing the image compression data the memory means to store in response to the trigger signal.

BRIEF DESCRIPTION OF THE DRAWINGS

The present invention will become more clearly appreciated as the disclosure of the invention is made with reference to the accompanying drawings. In the drawings.

DESCRIPTION OF THE PREFERRED EMBODIMENT

Figure 1:
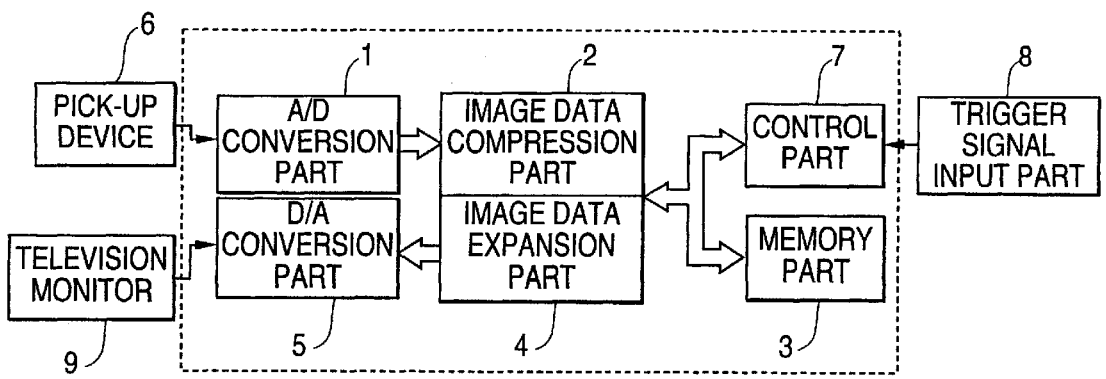
FIG. 1 is a block diagram illustrating the construction of one embodiment of the present invention.

FIG. 1 illustrates an embodiment of an image storing and processing device according to the present invention. As shown in FIG. 1, an A/D conversion part 1 is provided for converting an analog video signal from an external pick-up device 6 (television camera) to a digital video signal of a brilliance signal Y and color difference signal C. A JPEG (Joint Photographic Experts Group) system image data compression part 2 is provided for compressing the digital video signal and outputting image compression data. A memory part 3 is provided for storing the image compression data, and an image data expansion part 4 is provided for selecting and expanding the stored image compression data from the memory part 3 and outputting image expansion data. Also shown in FIG. 1 are a D/A conversion part 5 for converting the image expansion data (digital video signal) to an analog video signal, and a control part 7 (microcomputer) for controlling the image compression part 2, the expansion part 4 and the memory part 3. The device also includes a trigger signal input part 8 and a television monitor 9.

In the image storing and processing device constructed as described above, an analog video signal inputted from a pick-up device 6 is converted in an A/D conversion part 1 to a digital video signal, which is in turn compressed in an image data compression part 2. The resulting image compression data is stored in a memory part 3. Stored image compression data is transferred to an image data expansion part 4, and is selected and expanded. The resulting image expansion data is converted into an analog video signal in a D/A conversion part 5 and is sent to a television monitor 9 for its display.

The trigger signal input part 8 receives a trigger signal generated in response to the aforementioned event happening. The control part 7 controls the operation such that only a required image is compressed and stored with the trigger signal, whereby a required image is arbitrarily selected and displayed on the television monitor 9. Only the required image is stored in such a manner and used as compression data, whereby storage efficiency is improved.

The length of the compressed image data generated by the image compression is variable. More specifically, the more complicated the input images are, the more the compression image data length increases. Accordingly, since the number of images capable of being stored in the memory part of a particular capacity is usually different in response to an input image, control of the memory part is complicated.

Figure 2:
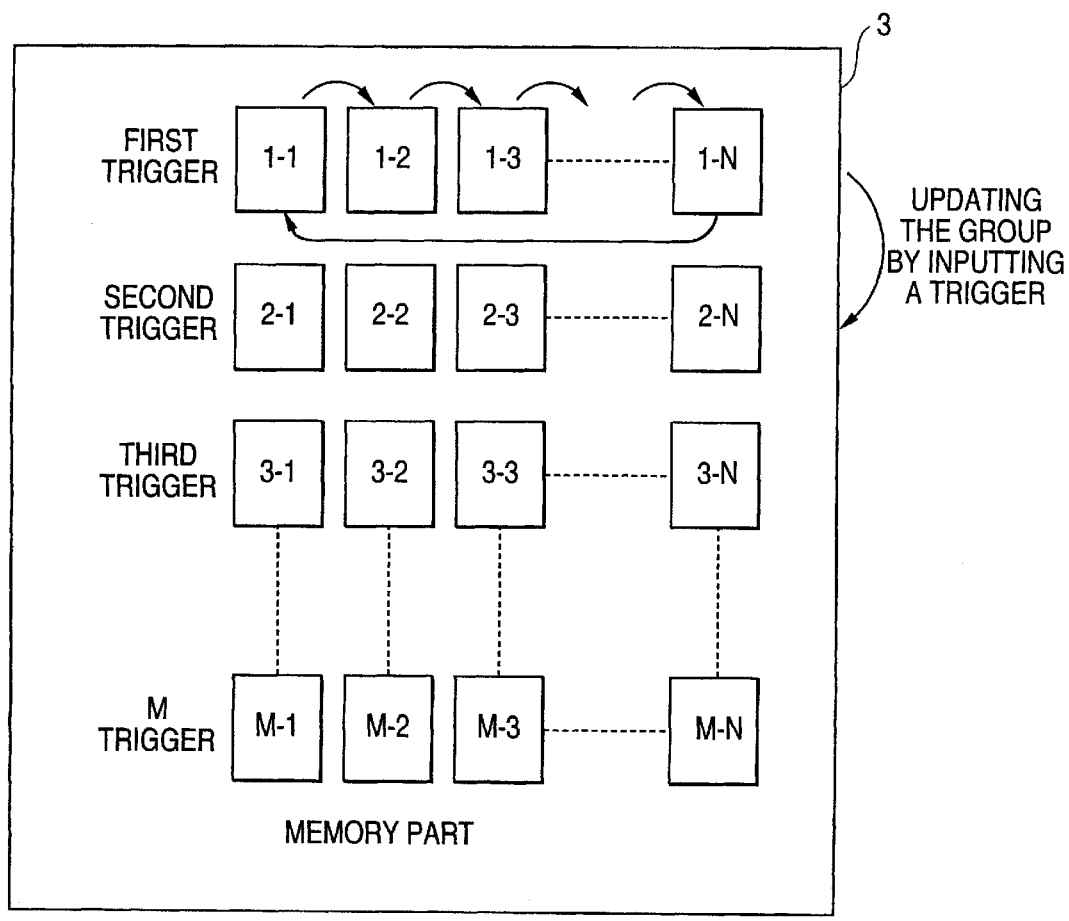
FIG. 2 is an illustration describing a control method of a memory part in the embodiment of FIG. 1.

To solve this, in the present invention, the number of pages of images capable of being stored is previously set, and a storage area of the memory part 3 is divided equally into the set number of pages of the images. For example, as illustrated in FIG. 2, the memory part 3 is divided equally into (M×N) memory areas with 1-M groups having each N memory areas arranged horizontally. The control part 7 controls such that the memory part stores the image compression data updating the respective memory areas of the first group at a predetermined time interval in the order of 1-1, 1-2, 1-3, . . . 1-N, and 1-1 when no trigger signal is inputted (or when the first trigger signal is inputted). When a trigger signal is inputted (or when the second trigger signal is inputted) the storage location for the image compression data is altered from the first group to the second group and later in serial order, whereby N pages of the image compression data before the trigger signal is inputted are stored in the memory areas of the previous group. The operation is controlled in such a manner that, when no trigger signal is inputted, the image compression data is stored updating the respective memory areas of the same group, and the group of the memory areas is changed to the next group each time a trigger signal is inputted, whereby M trigger signals are dealt with.

As described above, only the required image data can be efficiently stored taking a trigger signal input from the outside as the timing of image recording by storing and processing image data as described above. Further, display of image data is arbitrarily ensured by selecting the number of the memory area of the image compression data.

Further, provided the control part 7 controls the operation such that the compression rate of the image compression part 2 is increased when a data amount obtained by the image compression by the image compression part 2 is always monitored, and generated image compression data exceeds the storage capacity of the storage area corresponding to one page of the image, the number of pages of the stored images set as described above can be secured at all times. Control of the aforementioned compression rate is dealt with by altering a quantized table or a scaling factor.

Furthermore, it is also possible to take the following exemplary cases by employing the aforementioned control system of such a compression rate and preparing several modes as the mode of the aforementioned set number of pages of the stored image.

For example, it is possible to divide and set those set in (M×N) memory areas at present with the compression rate of ½ into (M×N×2) memory areas by increasing the compression rate of the image compression. Although the image quality is more or less deteriorated at the increased compression rate, it is considered sufficient in applications where high image quality is not required, so that the following three modes can be set by taking the high compression rate mode as an economy mode and comparing it with the case of the division into the (M×N) storage areas: (i) high quality image mode (the storage area is divided into M (group)×N (page); (ii) economy mode I (the storage area is divided into M (group)×N×2 (pages); and (iii) economy mode II (the storage area is divided into M×2 (group)×N (page).

In what follows, there will be described one embodiment where the aforementioned image storing and processing device of the present invention is applied to a railroad crossing monitor.

Figure 3:
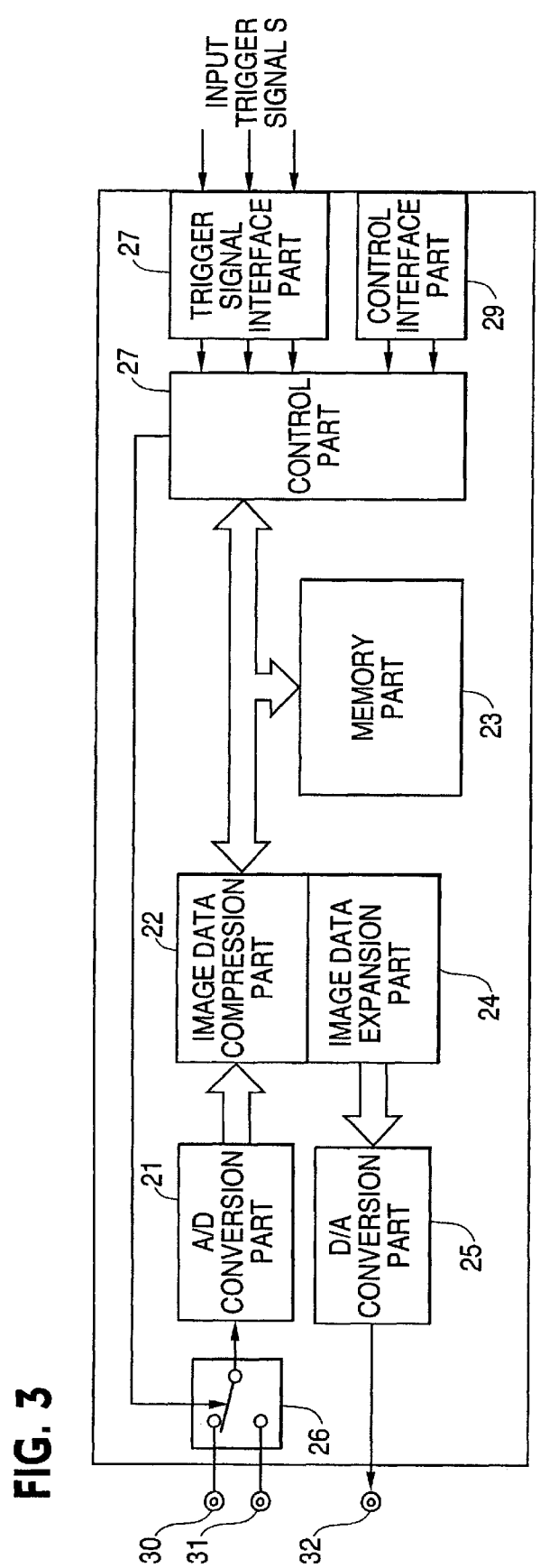
FIG. 3 is a block diagram illustrating one embodiment of a railroad crossing monitor device of the present invention.
Figure 4:
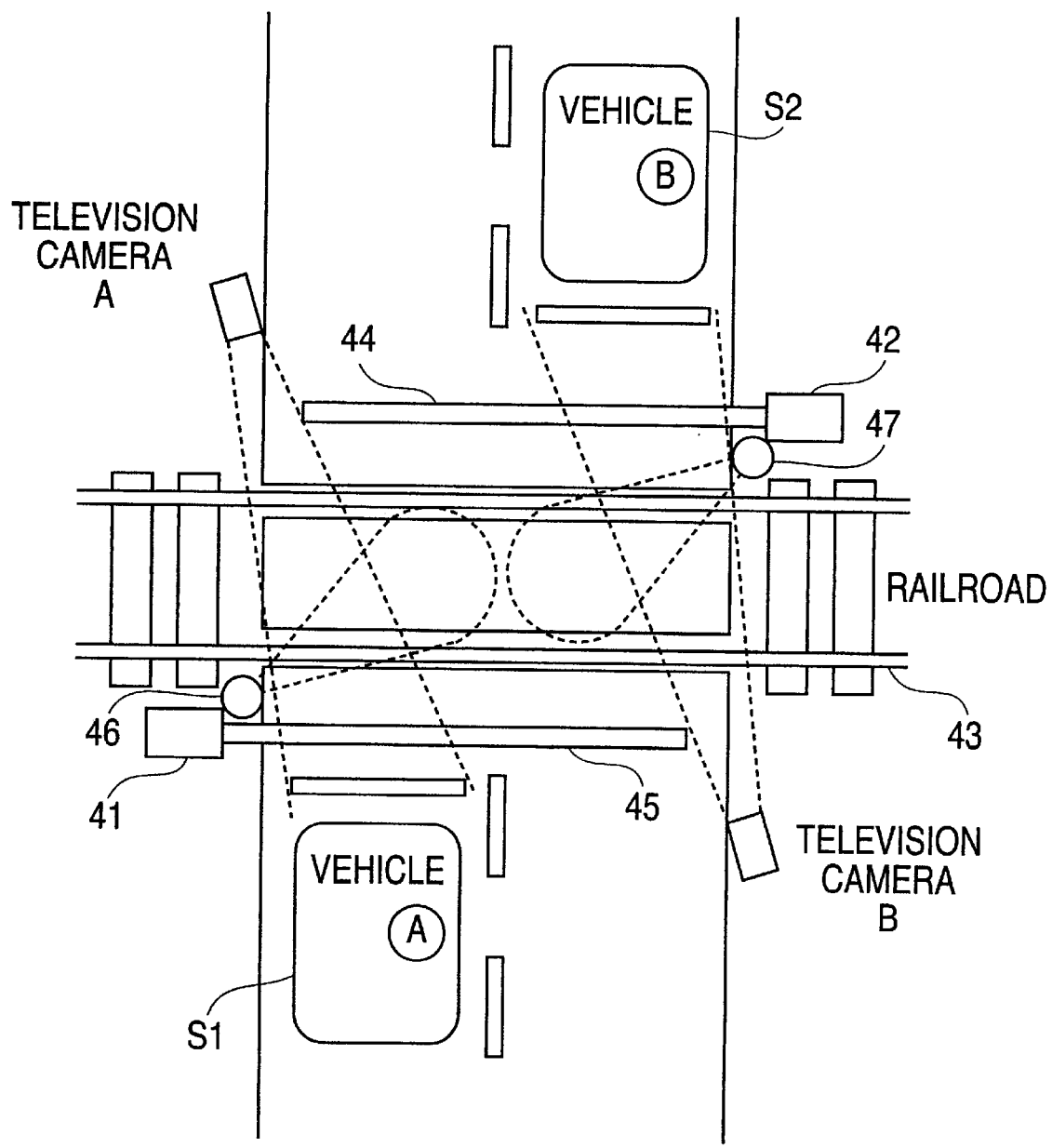
FIG. 4 is an illustration of a layout of a railroad crossing using the monitor device of FIG. 3.

FIGS. 3 and 4 illustrate a railroad crossing monitor taken as one embodiment of the present invention. As shown in the block diagram of FIG. 3, the railroad crossing monitor includes an A/D conversion part 21, an image data compression part 22, a memory part 23, an image data expansion part 24, a D/A conversion part 25, a television camera changeover part 26, a control part 27, a trigger signal interface part 28, a control interface part 29, input terminals 30, 31 for analog video signals from television cameras A, B, and an output terminal 32 to a television monitor.

Further, as shown in FIG. 4, the railroad crossing monitor includes crossing gates 41, 42 of railroad crossings 44, 45 for a roadway 43, and vehicle inrush detection sensors 46, 47 in which the television cameras A, B are disposed in the railroad crossings where vehicles S1, S2 can be photographed from front surfaces thereof (note that FIG. 4 shows the vehicles S1, S2 traveling on the left sides of the road consistent with the customs and laws of Japan and Europe). The sensors 46, 47 are disposed where they can detect an inrush of vehicles into the railroad crossings, for which there may be employed sensors using, for example, ultrasonic waves and laser light.

Figure 5:
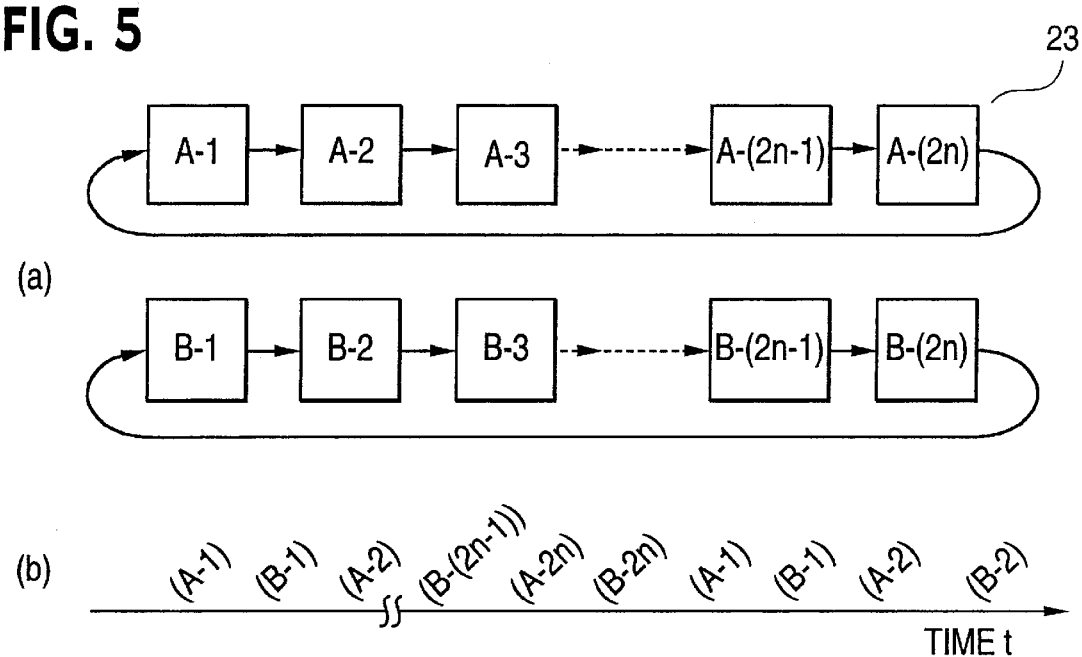
FIG. 5 is an illustration of a control method of the memory part in the above embodiment in which (a) illustrates the order of updating of each memory area, and (b) illustrates timing of the order.

The circuit arrangement of FIG. 3 is substantially the same as that of FIG. 1, and a storing and processing operation of the circuit for image data is substantially the same. Thus, the memory part 23 for example, as illustrated in FIG. 5(a), includes memory areas A-1 to A-(2n), and B-1 to B-(2n) for 2n pages of image compression data for photographed images by the television cameras A, B. The control part 27 controls, as illustrated in FIG. 5(b), the television camera changeover part 26 to change over the television cameras A, B at a predetermined time interval and promote storage of image compression data updating the memory area.

Pages of image compression data are recorded after the sensors 46, 47 detect a vehicle in an arbitrary timing in such a manner, whereby 2n images before and after an inrush of the vehicle into the railroad crossings can be stored.

Figure 6:
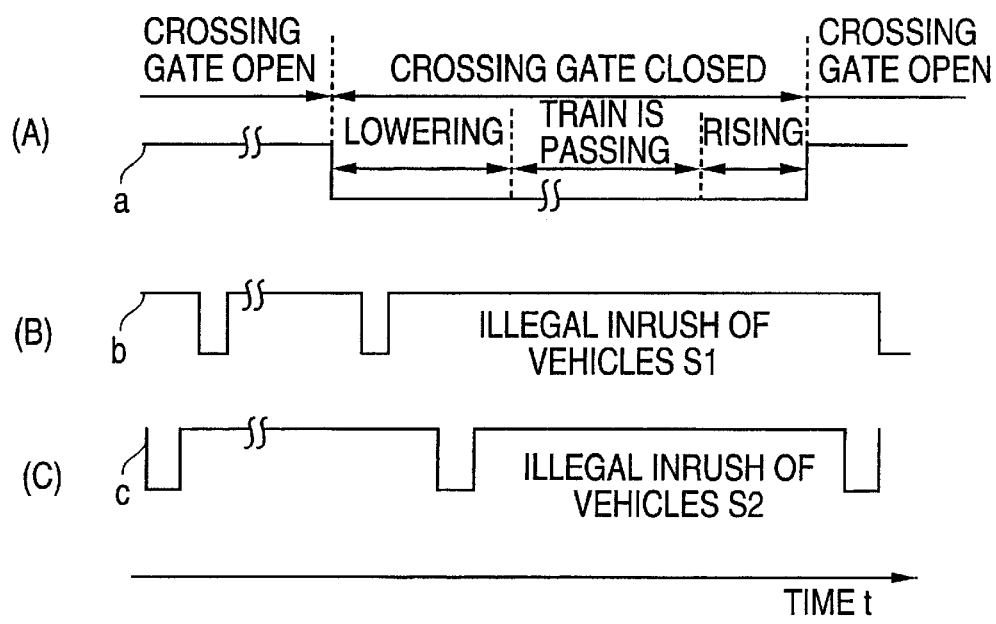
FIG. 6 is an illustration of generation of a trigger signal in which (A) indicates a crossing gate opening/closing control signal a, (B) indicates a detection signal b of a sensor 46, and (C) indicates a detection signal c of a sensor 47.

Illegal inrush of a vehicle into the railroad crossings can be detected on the basis of an opening/closing control signal from the crossing gates 41, 42 and detection signals from the sensors 46, 47. More specifically, as clarified from FIG. 6, time t from starting of lowering of the crossing gates to passage of a train can be detected on the basis of the opening/closing control signal a in FIG. 6(A). When the sensors 46, 47 detect the inrush of the vehicle into the railroad crossings within this time t, the illegal inrush is detected in this timing. Accordingly, a trigger signal s is generated on the basis of the opening/closing control signal a and the detection signals b, c in FIGS. 6(B) and 6(C) in the foregoing timing. The trigger signal s is sent to the trigger signal interface part 28, and the detection signals b, c from the foregoing sensors 46, 47 are sent to the television camera changeover part 26 to change output video signals from the television camera A, B and record and store an image of the illegal inrush vehicle in the foregoing timing.

It should be noted that when only an image of an illegal vehicle corresponding to one page upon inrush of the illegal vehicle is to be recorded and stored, the foregoing division of the storage area in the memory part 23 is unnecessary.

Further, provided the foregoing railroad crossing monitor device and a concentrated control center for vehicles are connected with each other through an exclusive telephone channel, presence of any illegal vehicle inrush is rapidly informed and transfer of a necessary image is ensured.

According to the present invention, as described above, when an event that may happen at any time, and when a state before and after the event is recorded and stored with an image, only a necessary image is efficiently stored, and the recorded image can be easily retrieved.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An image storing and processing device comprising:

A/D conversion means for converting a video signal from a pick-up device to a digital video signal;

image compression means for compressing said digital video signal and outputting image compression data;

memory means for storing said image compression data;

image expansion means for selecting the stored image compression data from the memory means for image expansion, and outputting the image compression data as image expansion data; and D/A conversion means for converting the image expansion data to an analog image signal;

wherein said memory means includes a plurality of groups of memory areas divided in response to a previously set number of storable images, and a control means forces the memory means to store compressed image data while updating each of the memory areas of the same group at a predetermined time interval when no trigger signal is inputted, and controls the operation such that storage location is altered to the memory area of another group in response to an input of a trigger signal.

2. The image storing and processing device according to claim 1, wherein said control means controls said image compression means so that a compression rate of the image compression means is increased when an amount of data exceeds the memory capacity corresponding to one page of a picture image.

3. The image storing and processing device according to claim 2, wherein two of said pick-up devices are each installed where they can photograph vehicles in a railroad crossing, a sensor is provided for detecting an inrush of a vehicle into the railroad crossing, and changeover means is provided for generating said trigger signal with an opening/closing control signal of a crossing gate provided at the railroad crossing and a detection signal from said sensor and for changing over the pick-up devices with a detection signal from the sensor.

4. The image storing and processing device according to claim 1, wherein two of said pick-up devices are each installed where they can photograph vehicles in a railroad crossing, a sensor is provided for detecting an inrush of a vehicle into the railroad crossing, and changeover means is provided for generating said trigger signal with an opening/closing control signal of a crossing gate provided at the railroad crossing and a detection signal from said sensor and for changing over the pick-up devices with a detection signal from the sensor.

5. An image storing and processing device comprising:

two pick-up devices each installed at a position in a railroad crossing where vehicles can be photographed;

a sensor for detecting an inrush of a vehicle into the railroad crossing;

changeover means for changing over said pick-up devices with a detection signal of said sensor;

A/D conversion means for converting a video signal from the pick-up device changed over by said changeover means to a digital video signal;

image compression means for compressing said digital video signal to output image compression data;

memory means for storing said image compression data;

image expansion means for expanding the stored image compression data retrieved from said memory means into image expansion data;

D/A conversion means for converting said image expansion data to an analog video signal; and control means for generating a trigger signal with an opening/closing control signal of a crossing gate provided on the railroad crossing and the detection signal of the sensor and forcing the memory means, to store said image compression data in the memory means in response to the trigger signal.

6. A monitoring device for a railroad crossing, comprising:

a first video pick-up device located near a railroad crossing for photographing a vehicle passing through the railroad crossing in a first lane;

a second video pick-up device located near the railroad crossing for photographing a vehicle passing through the railroad crossing in a second lane;

a sensor means for detecting a vehicle passing through the railroad crossing and outputting a detection signal indicating which lane the detected vehicle is in;

changeover means for changing over an image processing device based on the detection signal so that a video signal is received only from the pick-up device photographing the detected vehicle;

A/D conversion means for converting the received video signal from the pick-up device photographing the detected vehicle to a digital video signal;

image compression means for compressing said digital video signal to output image compression data;

memory means for storing said image compression data;

image expansion means for expanding the stored image compression data retrieved from said memory means into image expansion data;

D/A conversion means for converting said image expansion data to an analog video signal; and control means for generating a trigger signal with an opening/closing control signal of a crossing gate provided on the railroad crossing and the detection signal of the sensor and forcing the memory means to store said image compression data in the memory means in response to the trigger signal.

7. The monitoring device according to claim 6, wherein said control means controls said image compression means so that a compression rate of the image compression means is increased when an amount of data exceeds the memory capacity corresponding to one page of a picture image.

* * * * *